(12) United States Patent
Dombrowski et al.

(10) Patent No.: US 9,745,459 B2
(45) Date of Patent: Aug. 29, 2017

(54) REDISPERSIBLE POLYMER POWDER

(71) Applicant: Dow Global Technologies LLC, Midland, MI (US)

(72) Inventors: Juergen Dombrowski, Halle (DE); Hartmut Kuehn, Halle (DE); Margarita Perello, Duebendorf (CH); Sonja Scharlemann, Wedemark (DE)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/652,135

(22) PCT Filed: Dec. 11, 2013

(86) PCT No.: PCT/US2013/074249
§ 371 (c)(1),
(2) Date: Jun. 15, 2015

(87) PCT Pub. No.: WO2014/093418
PCT Pub. Date: Jun. 19, 2014

(65) Prior Publication Data
US 2015/0322253 A1 Nov. 12, 2015

Related U.S. Application Data

(60) Provisional application No. 61/737,280, filed on Dec. 14, 2012.

(51) Int. Cl.
| | |
|---|---|
| *C08L 33/08* | (2006.01) |
| *C08L 25/10* | (2006.01) |
| *C08L 31/04* | (2006.01) |
| *C08J 3/12* | (2006.01) |
| *C04B 28/02* | (2006.01) |
| *C04B 40/00* | (2006.01) |
| *C08L 9/02* | (2006.01) |
| *C04B 103/00* | (2006.01) |
| *C04B 111/00* | (2006.01) |
| *C04B 111/28* | (2006.01) |

(52) U.S. Cl.
CPC .............. *C08L 33/08* (2013.01); *C04B 28/02* (2013.01); *C04B 40/0042* (2013.01); *C08J 3/12* (2013.01); *C08L 9/02* (2013.01); *C08L 25/10* (2013.01); *C08L 31/04* (2013.01); *C04B 2103/0057* (2013.01); *C04B 2111/00637* (2013.01); *C04B 2111/28* (2013.01); *C08L 2205/03* (2013.01); *Y02W 30/96* (2015.05)

(58) Field of Classification Search
CPC ..... C04B 40/0042; C04B 28/02; C04B 18/22; C04B 20/008; C04B 24/2623; C04B 24/2676; C04B 40/0608; C04B 2103/0057; C04B 2111/00637; C04B 2111/28; C08J 3/12; C09J 133/08; C09J 125/10; C09J 139/04; C09J 131/04; C08L 25/10; C08L 33/08; C08L 31/04; C08L 29/04; C08L 9/06; C08L 17/00; C08L 2205/03; C08L 9/02; Y02W 30/96
See application file for complete search history.

(56) References Cited

U.S. PATENT DOCUMENTS

| | | | |
|---|---|---|---|
| 5,244,304 A | 9/1993 | Weill et al. | |
| 5,290,356 A | 3/1994 | Frankowski | |
| 5,416,181 A * | 5/1995 | Nguyen | ............... C08F 251/00 428/511 |
| 5,959,017 A * | 9/1999 | Eck | ............................ C08J 3/22 524/425 |
| 2005/0241539 A1* | 11/2005 | Hagen | .................... B63H 3/008 106/805 |
| 2010/0190888 A1* | 7/2010 | Gaeberlein | ......... C04B 24/2688 524/5 |
| 2011/0104377 A1* | 5/2011 | Zapf | ..................... C04B 20/023 427/385.5 |
| 2011/0104378 A1* | 5/2011 | Willimann | .......... C04B 20/1029 427/385.5 |

FOREIGN PATENT DOCUMENTS

| | | |
|---|---|---|
| EP | 2341083 A1 | 7/2011 |
| EP | 2341084 A1 | 7/2011 |
| EP | 2380927 A1 | 10/2011 |
| EP | 2397518 A1 | 12/2011 |
| EP | 2399955 A1 | 12/2011 |
| EP | 2433984 A1 | 3/2012 |
| EP | 2537818 A2 | 12/2012 |
| GB | 1498299 A | 1/1978 |
| KR | 20110110957 A | 10/2011 |
| KR | 20110110967 A * | 10/2011 |
| WO | 2013078675 A1 | 6/2013 |

OTHER PUBLICATIONS

KR 20110110967 A, Oct. 2011, Machine translation.*

* cited by examiner

*Primary Examiner* — Satya Sastri
(74) *Attorney, Agent, or Firm* — Andrew E. C. Merriam

(57) ABSTRACT

The present invention relates to a water redispersible polymer powder (RDP) which comprises a co-dried admixture of a water-insoluble film forming polymer, a colloidal stabilizer and rubber particles. The presence of rubber within the RDP does not significantly affect redispersibility and may, when incorporated into hydraulically-binding compositions, provide an improvement in the physical properties of the resultant hydraulically bound composition.

8 Claims, No Drawings

REDISPERSIBLE POLYMER POWDER

The present invention relates to redispersible polymer powders. In particular, the present invention relates to a redispersible polymer powder (RDP) which is suitable for use as an additive in a hydraulically binding composition such as a cement based tile adhesive (CBTA) or a base coat adhesive or reinforcement coat for External Thermal Insulation Composite Systems (ETICS). Also provided are dry mix formulations which comprise a hydraulic binder and said RDP, and hydraulically binding compositions comprising said dry mix formulation and water. In addition, methods for producing said RDP; for incorporating rubber as a constituent in a dry mix formulation comprising a hydraulic binder or in a hydraulically binding composition; and for providing a hydraulically bound composition having an improved tensile strength are also provided.

BACKGROUND

Significant efforts have, and continue to be, devoted to providing environmentally acceptable disposal or recycling mechanisms for waste rubber articles, particularly crosslinked or vulcanized rubber such as that used in motor vehicle tires. This continuing need to provide an acceptable disposal/recycling route is particularly acute due to the sheer scale of production (e.g. it has been estimated that 37 million car and truck tires are being discarded annually in the UK and this number is set to increase, in line with the growth in road traffic and car ownership, by a further 39% by 2021) coupled with the fact that, as rubber tires are extremely durable, disposal via landfill is problematic because the rate of biodegradation is exceptionally slow. Consequently, implementation of EU legislation has banned the disposal of tires in landfill sites. Further, disposal by incineration carries environmental concerns as combustion of tires tends to release significant amounts of unburned hydrocarbons and noxious emissions into the atmosphere, and melting tires also produce large quantities of oil, which may cause contamination of soil and ground water. Therefore, there is an increasing need to identify alternative solutions that promote recycling of such rubber products ahead of disposal.

A number of potential recycling routes for rubber products have been suggested. For example, waste tires have been used as fuel in cement-making operations; as fillers (when finely ground) in new tires, outdoor athletics surfaces and road asphalt; or as mulch.

However, in order to account for the growing number of waste rubber products, alternative recycling routes must be found.

One of the largest potential recycling routes for waste rubber is in construction industry, but usage of waste tires in civil engineering is, to date, very low—only about 4.5% of used tires are currently recycled in civil engineering applications which tend to be small-scale applications in single projects. In particular, it is known to incorporate (blend) powdered rubber into dry mix cementitious formulations. For example, U.S. Pat. No. 5,244,304A discloses a paving composition that comprises a cement binder, a dispersible latex polymer binder, and a mineral aggregate filler. The filler may be made up of mineral fines such as fly ash, mineral aggregate such as sand, and/or an elastomeric filler such as ground rubber particles; U.S. Pat. No. 5,290,356 discloses a concrete/rubber product made from a mixture comprising Portland cement, rubber crumb, water and sand, aggregate or light aggregate; and KR-A-2011110967 discloses a tile adhesive comprising Portland cement, silica, ground tire rubber, methyl cellulose, cellulose fiber and a redispersible polymer powder (RDP) resin.

RDPs made from emulsion polymers, such as vinyl acetate/ethylene copolymers, styrene/butadiene copolymers, and vinyl acetate/versatic acid vinyl ester copolymers are widely used in various construction applications, such as cement-based tile adhesives (CBTA) and ETICS adhesives or reinforcement coats to improve the mechanical properties of the cementitious compositions.

It is an object of the present invention to provide a convenient and environmentally acceptable use for waste rubber products, in particular crosslinked or vulcanised rubber, e.g. ground tire rubber particles. It is an additional object of the present invention to provide modified RDPs which, when incorporated into hydraulically binding compositions such as cementitious compositions for example CBTAs or ETICS adhesives or reinforcement coats, provide an improvement in the adhesive strength of resultant hydraulically set composition.

STATEMENT OF THE INVENTION

The present invention in its various aspects is as set out in the accompanying claims.

According to a first aspect, the present invention provides a RDP comprising a co-dried admixture of a water insoluble film-forming polymer and a colloidal stabilizer, wherein said co-dried admixture further comprises rubber particles.

According to a second aspect, the present invention provides a method for producing a RDP, said method comprising:
  a. providing an aqueous dispersion comprising a water-insoluble film-forming polymer and a colloidal stabilizer; and
  b. drying said aqueous dispersion,
wherein said aqueous dispersion further comprises rubber particles.

According to a third aspect, the present invention provides a dry mix formulation comprising hydraulic binder and from 0.1 to 40 weight percent of an RDP according to the first aspect of the invention.

According to a fourth aspect, the present invention provides a hydraulically binding composition comprising the dry mix formulation of the third aspect of the invention and water.

According to a fifth aspect, the present invention provides a method for incorporating rubber as a constituent in a dry mix formulation comprising a hydraulic binder or in a hydraulically binding composition, wherein said method comprises admixing an RDP according to the first aspect of the invention with a hydraulic binder.

According to a sixth aspect, the present invention provides a method for providing a hydraulically bound composition having an improved tensile strength, said method comprising:
  a. providing a dry mix formulation comprising a hydraulic binder and from 0.1 to 40 weight percent of a RDP, said RDP comprising a co-dried admixture of:
     i. a water-insoluble film forming polymer comprising a styrene-butadiene copolymer or the copolymerization product of styrene, butadiene and one or more other monomer; and
     ii. a colloidal stabilizer;
  b. combining said dry mix formulation with water to form a hydraulically binding composition; and
  c. allowing said hydraulically binding composition to dry, wherein said co-dried admixture further comprises rubber particles.

RDPs prepared according to the present invention represent a convenient and environmentally acceptable use for waste rubber products, in particular crosslinked or vulcanised rubber, e.g. ground tire rubber particles. Preferably, the RDPs prepared according to the present invention, when incorporated into hydraulically binding, in particular cementitious compositions such as CBTAs or ETICS adhesives or reinforcement coats, provide an improvement in the adhesive strength of resultant hydraulically set composition.

DETAILED DESCRIPTION OF THE INVENTION

Throughout the specification, any reference to percent or percent weight etc. is expressed in terms of dry weight of the composition unless otherwise specified.

"Glass transition temperature" or "$T_g$" is the glass transition temperature of a copolymer calculated using the Fox equation [Bulletin of the American Physical Society 1, 3 Page 123 (1956)] as follows:

$$1/T_g = w_1/T_{g(1)} + w_2/T_{g(2)}$$

For a copolymer, $w_1$ and $w_2$ refer to the weight fraction of the two monomers, based on the weight of monomers charged in the reaction vessel, and $T_{g(1)}$ and $T_{g(2)}$ refer to the glass transition temperatures of the two corresponding homopolymers in degrees Kelvin. For polymers containing three or more monomers, additional terms ($w_n/T_{g(n)}$) are added. The glass transition temperatures of the homopolymers for the purpose of this invention are those reported in "Polymer Handbook", edited by J. Brandrup and E. H Immergut, Interscience Publishers, 1966, unless that publication does not report the $T_g$ of a particular homopolymer, in which case the $T_g$ of the homopolymer is measured by differential scanning colorimetry (DSC). To measure the glass transition temperature of a homopolymer by DSC, the homopolymer sample is prepared and maintained in the absence of ammonia or primary amine. The homopolymer sample is dried, preheated to 120° C., rapidly cooled to −100° C., and then heated to 150° C., at a rate of 20° C./minute while data is collected. The glass transition temperature for the homopolymer is measured at the midpoint of the inflection using the half-height method.

The term "Hydraulic binder" refers to any material that solidifies and hardens, in either wet or dry conditions, via the chemical process of hydration following combination with water. Such materials include but are not limited to cement, lime, pozzolanic soils, fly ash, lime and granulated blast furnace slag.

The terms "hydraulically binding" and "hydraulically bound" each refer to hydraulic binder-containing compositions which have been combined with water, with the earlier term relating to the composition in its workable, unset form, whereas the later term relates to the composition following completion of the setting process. For the avoidance of doubt, the term "hydraulic composition" as used herein refers to both hydraulically binding and hydraulically bound compositions.

It has been discovered surprisingly that rubber particles may be incorporated as a co-dried additive in an RDP without causing a significant detrimental impact upon the physical performance of either the RDP per se or a hydraulically bound composition comprising such an RDP. In particular, it has been found that fully redispersible powders may be produced in which a proportion, e.g. 90%, of the base polymer is replaced with rubber particles. Further, it has been found that, following incorporation of such RDPs, no significant detrimental impact upon the physical properties, e.g. tensile adhesive strength, of hydraulic compositions was observed in comparison with compositions comprising conventional RDPs. In fact, when rubber particles are incorporated into styrene/butadiene-containing RDPs, such RDPs have been shown to provide an improvement in tensile adhesive strength upon incorporation into hydraulic compositions.

The RDP of the present invention comprises a co-dried admixture of a water-insoluble film-forming polymer, a colloidal stabilizer and rubber particles. Preferably, the water-insoluble film forming polymer is either:

a. a styrene-butadiene copolymer or the copolymerization product of styrene, butadiene and one or more other monomer;

b. a vinyl acetate-ethylene copolymer or the copolymerization product of vinyl acetate, ethylene and one or more other monomer; or c. an acrylic polymer or the copolymerization product of an acrylic monomer and one or more other monomer, preferably the copolymerization product of an acrylic monomer, styrene and, optionally, one or more other monomer.

More preferably, the water-insoluble film forming polymer is a styrene-butadiene copolymer or the copolymerization product of styrene, butadiene and one or more other monomer. Still more preferably, the polymer is the copolymerization product of styrene, butadiene, a carboxy-functional monomer and, optionally, one or more other monomer(s).

Preferably, the water-insoluble film forming polymer has a glass transition temperature of from −60° C. to 80° C. More preferably, the polymer has a glass transition temperature of from −40° C. to 40° C. Even more preferably, the polymer has a glass transition temperature of −20° C. to 25° C. If the $T_g$ is too high for use in hydraulic compositions, end use properties such as flexibility are detrimentally affected, especially at cold temperatures, and compositions comprising such RDPs tend to propagate cracks.

The RDP of the present invention comprises, as a co-dried additive, a colloidal stabilizer. Preferably, the colloidal stabilizer is selected from polyvinyl alcohols; water-soluble polysaccharides, e.g. starches and cellulosics; proteins such as casein or soy protein; and lignin sulfonates. More preferably, the colloidal stabilizer is a polyvinyl alcohol. Preferably, the colloidal stabilizer is included in an amount of at least 1 wt. %, more preferably from 1 wt. % to 20 wt. %, and still more preferably from 5 wt. % to 15 wt. %, based on the combined weight of the co-dried water-insoluble film-forming polymer and rubber particles.

The RDP of the present invention comprises, as a co-dried additive, rubber particles which may be wholly or partly obtained from waste or recycled materials. The rubber particles preferably comprise crosslinked or vulcanized rubber particles such as ground tire rubber (GTR) derived from waste motor vehicle tires. GTR is supplied commercially in many particle size ranges, with the broadest classes of GTR being generally referred to as "ground rubber" (crumb rubber of 1,520 μm sieve particle size, i.e. 10 mesh, or smaller), and "coarse rubber" (comprising particles larger than 0.6 cm).

Preferably, the rubber particles used in the present invention have a particle size of 1000 μm or less, preferably 750 μm or less, more preferably 500 μm or less. Such rubber particles are preferably obtained by shredding of used tires at ambient (approximately 15 to 25° C.) temperature before passing the shredded rubber through a sieve having an appropriate mesh particle size.

Preferably, the RDP comprises as co-dried additives, the film-forming water-insoluble polymer and rubber particles in a polymer to rubber weight ratio of from 99:1 to 1:9. It is believed that if the polymer to rubber ratio is below 1:9, i.e. the RDP comprises less than 10 wt. % polymer, the redispersibility of the resultant powder is adversely affected. More preferably, the polymer to rubber ratio is from 19:1 to 1:4, even more preferably from 9:1 to 2:3, and most preferably from 7:3 to 3:2.

The RDP of the present invention may be prepared by a) providing an aqueous dispersion comprising the water-insoluble film-forming polymer, colloidal stabilizer and rubber particles; and b) drying said aqueous dispersion.

The aqueous dispersion may be prepared by admixing or blending a dispersion of the polymer with the colloidal stabilizer and rubber particles either together or sequentially. For example, before spray drying, the colloidal stabilizer may be admixed with a dispersion of the polymer and stirred to obtain a homogenous mixture, followed by the addition of rubber particles to the mixture with continued stirring to obtain a homogenous mixture. Preferably, an aqueous dispersion of the water-insoluble film-forming polymer is admixed with each of the other components in a sequential fashion to obtain a homogenous dispersion which is then dried to obtain the RDP.

In addition to the water-insoluble film-forming polymer, colloidal stabilizer and rubber particles, conventional optional additives may be added in conventional amounts prior to drying the aqueous dispersion. Such additives include, but are not limited to antifoaming agents, salts, emulsifiers or surfactants, monosaccharides and disaccharides. Preferably, an anticaking agent, e.g. kaolin, is incorporated into the aqueous dispersion/RDP. When such an anticaking agent is included, it is added to the aqueous dispersion during the drying process and, if required, additional anticaking agent may be incorporated into the RDP upon completion of the drying process. Preferably, the anticaking agent is included in an amount of 40% by weight or less, more preferably 20% by weight or less, based on the dry weight of the aqueous dispersion.

In embodiments in which the water-insoluble film-forming polymer is a styrene-butadiene copolymer or the copolymerization product of styrene, butadiene and one or more other monomer, a basic compound, e.g. an alkali or alkaline earth metal hydroxide, is preferably added to the aqueous dispersion prior to the drying process in order to increase the water dispersibility of the resultant powder.

Preferably, the solids content of the aqueous dispersion to be dried is from 30 to 75% by weight, more preferably 35 to 60% by weight, even more preferably 40 to 60% by weight, based on the total weight of the dispersion.

It is preferred that the aqueous dispersion is dried by spray drying. Spray drying can be carried out in conventional spray drying plants, with atomization being carried by means of single-fluid or multi-fluid nozzles or a rotary disc atomizer.

RDPs of the present invention have a variety of uses. The RDPs may be used as functional additives in a wide range variety of compositions such as construction materials, in particular, in hydraulic materials such as CBTAs and/or ETICS adhesives/reinforcement coats.

According to a further aspect, the invention provides a dry mix formulation comprising hydraulic binder and from 0.1 to 40 weight percent, preferably 0.5 to 20 weight percent, more preferably from 1 to 10 weight percent, based on the total dry weight of the formulation, of an RDP of the invention.

Any conventional hydraulic binder is believed to be suitable for use in the present invention. Preferably, the hydraulic binder is a cement, more preferably a cement selected from the group consisting of Portland cement, Portland-slag cement, Portland-silica fume cement, Portland-pozzolana cement, Portland-burnt shale cement, blast-furnace cement, pozzolana cement, composite cement, calcium aluminate cement and combinations thereof. More preferably still, the cement is Portland cement. In preferred embodiments, the compositions comprise hydraulic binder in an amount not less than 10 weight percent, more preferably not less than 20 weight percent, and even more preferably not less than 30 weight percent. At the same time, it is preferred that the compositions comprise no more than 60 weight percent, more preferably no more than 50 weight percent and even more preferably no more than 40 weight percent hydraulic binder.

The dry mix formulations of the present invention may comprise additional conventional additives depending upon the desired end use. For example, CBTA and/or ETICS adhesive/reinforcement coat formulations typically comprise from 40 to 70 weight percent of a fine aggregate filler such as quartz sand, 0.05 to 1 weight percent of a water-soluble cellulose ether to control rheology, water retention, slip resistance and to provide improved workability. Further, in addition to the above components, the dry mix formulations of the present invention may comprise one or more conventional additives selected from organic or inorganic thickening agents and/or secondary water retention agents, anti-sag agents, air entraining agents, wetting agents, defoamers, superplasticizers, dispersants, calcium complexing agents, retarders, accelerators, water repellents, biopolymers and fibres, all of which are well known in the art and are available from commercial sources. Such additional additives may also be provided as co-dried additives in the RDP of the present invention.

Some embodiments of the invention shall now be further described by way of exemplification only. All ratios, parts and percentages are expressed by dry weight unless otherwise specified, and all components are of good commercial quality unless otherwise specified. Abbreviations used in the Examples and Tables are listed alongside their corresponding descriptions:

MHEC 25 k: hydroxyethyl methylcellulose commercially available from Dow Wolff Cellulosics GmbH as WALO-CEL™ MKX 25000 PF 25 L MHEC 40 k: hydroxyethyl methylcellulose commercially available from Dow Wolff Cellulosics GmbH as WALO-CEL™ MKX 40000 PF 01

Cement: Portland cement (CEM I 42.5 R) commercially available from Holcim (Germany) AG, production plant Lägerdorf, as Holcim-Pur 4™

FH31 Sand: FH31 quartz sand commercially available from Quarzwerke GmbH, Frechen plant FH34 Sand: FH34 quartz sand commercially available from Quarzwerke GmbH, Frechen plant F36 Sand: F36 quartz sand commercially available from Quarzwerke GmbH, Frechen plant Rubber: Recycled rubber particles (GTR) having a particle size of <400 μm obtained via shredding and sieving of used motor vehicle tires at ambient (approximately 20° C.) temperature

EXAMPLES

The effect on the tensile adhesive strength of cement based tile adhesives (CBTAs) and/or base coat adhesives/ reinforcement coats for ETICS upon incorporation of redispersible polymer powders comprising a co-dried admixture of a film-forming polymer, colloidal stabilizer and recycled rubber particles was demonstrated by comparing CBTAs and ETICS reinforcement coats comprising such rubber-containing RDPs with compositions comprising conventional RDPs, either in the presence or absence of co-blended rubber particles.

Preparation of Dry Mix Formulations

Throughout the following examples, dry mix formulations for ETICS reinforcement coats were prepared by combining Cement (30%), FH31 Sand (41.75%), F36 Sand (15%), calcium carbonate (10%) and MHEC 25 k (0.25%) with the remaining 3% being made up of a RPD or a combination of RDP and Rubber. Similarly, dry mix formulations for CBTAs were prepared by combining Cement (35%), FH34 Sand (32.7%), F36 Sand (29%) and MHEC 40 k (0.25%) with the remaining 3% being made up of a RDP or a combination of RDP and Rubber. For both ETICS and CBTA formulations, the dry components were combined in a 3 litre polyethylene bag which was subsequently sealed and manually shaken for a period of three minutes in order to form homogenous dry mix formulations.

Preparation of Hydraulically Binding (Cement) Compositions

Throughout the examples, the required quantity of hydraulically binding composition (either a CBTA or ETICS reinforcement coat) was prepared by combining a homogenous dry mix formulation with a measured amount of water and mixing by hand. In each case, the water-solids factor $$\left(\text{``}\frac{W}{S}\text{''}\right)$$

was calculated as follows:

$$\frac{W}{S} = \frac{\text{initial quantity of water (g)}}{\text{quantity of modified dry mortar (g)}}$$

Evaluation of ETICS Compositions

A) Slump (Consistency)

The slump of ETICS compositions was determined according to CE 63.3. The water-solids factor is then calculated as above, wherein the quantity of water added results in a standard slump of 150±5 mm.

B) Viscosity

The Brookfield viscosity of ETICS compositions was determined according to CE 5.17, with measurements being recorded immediately following mixing of the ETICS composition and 5 minutes after the initial recording.

C) Tensile Adhesive Strength

The adhesive strength of ETICS compositions was determined according to CE 90.1. In such tests, polystyrene test plates to which a layer of ETICS has been applied are stored for 12 days under standard climate conditions (23° C.±2, 50% rel. humidity±5 at an air flow of <0.2 m) before the adhesive strength is quantified by recording the force required to pull the applied adhesive off the polystyrene plate. In addition, the pull-out from the polystyrene plate was visually observed and allocated a performance rating from grade 1 ("deep pull-out from the substrate") to grade 6 ("adhesive broke clearly from the substrate"). The tests were also repeated using a concrete slab in place of the polystyrene plate. Each recorded adhesive strength value represents the average from 9 individual test values obtained Evaluation of CBTA Compositions A) Setting Time The setting time of CBTAs was determined according to CE.94.1 using an automated Penetrometer (Dettki AVM-14-PNS), supplied by Dettki Messautomatisierung, 78736 Epfendorf/Germany. The samples are placed into the penetrometer for automated analysis, with setting times being calculated from a notional start point at which mixing was initiated. During the testing procedure, the time at which needle penetration is limited to a depth 36 mm is recorded as the setting "start" time with the time at which the needle penetration is limited to a depth of 2 mm being recorded as the setting "end" time. By simple subtraction of the recorded start value from the recorded end value, a setting duration is calculated.

B) Viscosity

The Brookfield viscosity of CBTA compositions was determined according to CE 5.17, with measurements being recorded immediately following mixing of the CBTA and 5 minutes after the initial recording.

C) Tensile Adhesive Strength

The adhesive strength of CBTA compositions was determined according to European Standard EN 1348. In such tests, the tensile adhesive strength is determined following storage of adhered tiles under the following conditions:

normal storage (7 d): Adhered tiles stored for 7 days under standard climate (23° C. and 50% relative humidity) conditions normal storage (28 d): Adhered tiles stored for 28 days under standard climate conditions water storage: Adhered tiles stored for 7 days under standard climate conditions, followed by water immersion for 20 days before storage for a final day under standard climate conditions heat storage: Adhered tiles stored for 14 days under standard climate conditions followed by storage in an air-circulating oven at 70±3° C. for 14 days before storage for a final day under standard climate conditions Freeze-thaw storage: Adhered tiles stored for 7 days under standard climate conditions followed by water immersion for 21 days before the commencement of 25 freeze-thaw cycles. In each freeze-thaw cycle, the adhered tiles are removed from the water and placed in a cold chamber (−15±3° C.) for 120±20 minutes before re-immersion in water (+15±3° C.) at which temperature the tiles are maintained for a minimum of 120 minutes before the next freeze-thaw cycle (if required) is commenced. Upon completion of the final cycle, the tiles are stored for a final day under standard climate conditions D) Open Time The Open time of CBTA compositions was determined according to European Standard EN 1346. In such tests, determination of the tensile adhesive strength of the adhesive is carried out, following storage for 28 days under standard climate conditions (23° C.±2, 50% rel. humidity±5 at an air flow of <0.2 m), by applying a force which increases at a constant rate of 250±50 N/s. The open time, measured in N/mm², is recorded as the adhesion strength following embedding of a tile within the adhesive at time intervals of 10, 20 and 30 minutes after application of the CBTA composition. CBTAs are classified as shown below:

| Open time - Minimum adhesion strength (EN 1346) | | | |
|---|---|---|---|
| Class | 10 min (N/mm$^2$) | 20 min (N/mm$^2$) | 30 min (N/mm$^2$) |
| C1 |  | 0.5 |  |
| C2 |  | 0.5 |  |
| ...E |  |  | 0.5 |
| ...F | 0.5 |  |  |

Example 1

RDP preparation

To demonstrate the effect of the invention, nine RDPs were prepared as shown below in Table 1. In each example, an aqueous dispersion was prepared containing a styrene/butadiene (SB), vinyl acetate/ethylene (VAE) or acrylic-containing polymer and, in the case of SB dispersions, the pH of the latex was adjusted to pH 11. Polyvinyl alcohol (PVOH) was then added to the aqueous dispersion before the addition (if required) of rubber particles. The resultant rubber latex blend was then mixed thoroughly before being spray dried (water evaporation: 1 kg/h; air flow: 80 kg/h; inlet temperature air: 130° C. to 180° C.; Outlet temperature: 50° C. to 70° C.; separate dosage of anti-caking agent (12% kaolin)) on a laboratory scale.

TABLE 1

| Example | Base Polymer | Colloidal Stabilizer (wt. %) | Polymer:Rubber |
|---|---|---|---|
| 1.1 (Comparative) | 62% styrene; 35% butadiene; 3% itaconic acid (T$_g$ +8° C.) | PVOH (12) | — |
| 1.2 (Comparative) | 52% styrene; 45% butadiene; 3% itaconic acid (T$_g$ −15° C.) | PVOH (12) | — |
| 1.3 (Comparative) | 82% vinyl acrylate; 18% ethylene (T$_g$ +6° C.) | PVOH (12) | — |
| 1.4 (Comparative) | 91% vinyl acrylate; 9% ethylene (T$_g$ +17° C.) | PVOH (12) | — |
| 1.5 (Comparative) | 40% styrene; 60% butyl acrylate (T$_g$ +6° C.) | *Melment ™ F10 (15) | — |
| 1.6 | 62% styrene; 35% butadiene; 3% itaconic acid (T$_g$ +8° C.) | PVOH (12) | 4:1 |
| 1.7 | 52% styrene; 45% butadiene; 3% itaconic acid (T$_g$ −15° C.) | PVOH (12) | 4:1 |
| 1.8 | 52% styrene; 45% butadiene; 3% itaconic acid (T$_g$ −15° C.) | PVOH (12) | 7:3 |
| 1.9 | 82% vinyl acetate; 18% ethylene (T$_g$ +6° C.) | PVOH (12) | 4:1 |
| 1.10 | 91% vinyl acetate; 9% ethylene (T$_g$ +17° C.) | PVOH (12) | 4:1 |
| 1.11 | 40% styrene; 60% butyl acrylate (T$_g$ +6° C.) | *Melment ™ F10 (15) | 4:1 |

*Melment ™ F10 is a sulfonated melamine polycondensation product commercially available as a superplasticizer from BASF.

Example 2

Reinforcement Coat for ETICS

In order to demonstrate the effect of RDPs comprising, as a co-dried additive, rubber particles, six ETICS formulations were prepared as shown below in Table 2 and 2A. In each example, a dry mix formulation was prepared as detailed above wherein the formulation comprised, as appropriate, either 3% of an RDP of Example 1 or a blend comprising 2.4% of an RDP of Example 1 and 0.6% rubber particles.

TABLE 2

| Example | 2.1 (Comp.) | 2.2 (Comp.) | 2.3 (Comp.) | 2.4 (Comp.) |
|---|---|---|---|---|
| RDP | Example 1.1 (3%) | Example 1.2 (3%) | Example 1.1 (2.4%) | Example 1.5 (3%) |
| Blended Rubber Particles | 0% | 0% | 0.6% | 0% |
| $\frac{W}{S}$ | 0.22 | 0.22 | 0.22 | 0.195 |
| Slump (mm) | 148 | 146 | 149 | 149 |
| Brookfield Viscosity (Pa s) |  |  |  |  |
| Immediate | 412 | 462 | 415 | — |
| 5 minute | 527 | 577 | 496 | — |
| % increase | 27.9 | 24.9 | 19.5 | — |
| Density (g/cm$^3$) | 1.43 | 1.45 | 1.46 | 1.68 |
| Tensile Adhesive Strength (N/mm$^2$) |  |  |  |  |
| 12d NC, polystyrene | 0.06 | 0.05 | 0.06 | 0.05 |
| Performance rating | 6 | 6 | 6 | — |
| 12d NC, concrete | 0.67 | 0.56 | 0.62 | 0.60 |

TABLE 2A

| Example | 2.5 | 2.6 | 2.7 | 2.8 |
|---|---|---|---|---|
| RDP | Example 1.6 (3%) | Example 1.7 (3%) | Example 1.8 (3%) | Example 1.11 (3%) |
| Blended Rubber Particles | 0 | 0 | 0% | 0% |
| $\frac{W}{S}$ | 0.21 | 0.21 | 0.21 | 0.195 |
| Slump (mm) | 151 | 150 | 149 | 148 |

TABLE 2A-continued

| Example | 2.5 | 2.6 | 2.7 | 2.8 |
|---|---|---|---|---|
| Brookfield Viscosity (Pa s) | | | | |
| Immediate | 419 | 452 | 458 | — |
| 5 minute | 473 | 504 | 498 | — |
| % increase | 12.9 | 11.5 | 8.7 | — |
| Density (g/cm$^3$) | 1.53 | 1.50 | 1.51 | 1.74 |
| Tensile Adhesive Strength (N/mm$^2$) | | | | |
| 12d NC, polystyrene | 0.09 | 0.09 | 0.07 | 0.05 |
| Performance rating | 1-2 | 1-2 | 4 | — |
| 12d NC, concrete | 0.75 | 0.86 | 0.76 | 0.57 |

With regard to SB-containing RDPs, it is evident that the water demand of the composition was reduced upon incorporation of an RDP comprising, as a co-dried additive, rubber particles in comparison with both rubber-free compositions (Examples 2.1 and 2.2) and compositions comprising a blend of rubber-free RDP and rubber particles (Example 2.3).

Therefore, as low water demand is believed to provide a clear indication of both good redispersibility and adhesive properties, it may be concluded that the incorporation of rubber as a co-dried additive in RDPs did not have a negative impact upon either redispersibility or adhesion. Further, the fact that the water demand was not increased upon incorporation of rubber into an acrylic-containing RDP (see Example 2.4 v Example 2.8) also indicates that the incorporation of rubber into such RDP systems does not have a significant negative impact upon redispersibility and/or adhesion.

The SB-containing RDP data clearly indicates that the compositions of the present invention demonstrated an improvement in tensile adhesive strength in both polystyrene and concrete performance tests. Further, these compositions were shown to result in a reduction of pull out upon separation of the adhesive from polystyrene. In particular, Examples 2.5 and 2.6, which each comprised an RDP comprising 20% rubber as a co-dried additive, provided the strongest adhesion and best performance rating in the polystyrene containing compositions tested.

Further, although no such increase in tensile strength was observed upon incorporation of rubber into an acrylic-containing RDP, it is evident that the inclusion of rubber did not result in a significant reduction in tensile strength.

The SB-containing RDP Examples of the present invention were also shown to have an increased mortar density, which also suggests that the incorporation of rubber as a co-dried additive in SB-containing RDPs has a beneficial effect upon the overall stabilization of the ETICS composition.

Example 3

Cement Based Tile Adhesive Formulations (CBTAs)

In order to demonstrate the effect of RDPs comprising, as a co-dried additive, rubber particles, six CBTA formulations were prepared as shown below in Tables 3 and 4. In the examples of Table 3, dry mix formulations were prepared as detailed above wherein the formulation comprised, as appropriate, either 3% of a SB— containing RDP of Example 1, or a blend comprising 2.4% of an SB-containing RDP of Example 1 and 0.6% rubber particles. Analogous examples comprising VAE-containing RDPs are provided in Table 4.

TABLE 3

| Example | 3.1 (Comp.) | 3.2 (Comp.) | 3.3 | 3.4 (Comp.) | 3.5 (Comp.) | 3.6 |
|---|---|---|---|---|---|---|
| RDP | Example 1.1 (3%) | Example 1.1 (2.4%) | Example 1.6 (3%) | Example 1.2 (3%) | Example 1.2 (2.4%) | Example 1.7 (3%) |
| Blended Rubber Particles | 0% | 0.6% | 0% | 0% | 0.6% | 0% |
| $\frac{W}{S}$ | 0.21 | 0.21 | 0.21 | 0.21 | 0.21 | 0.21 |
| Setting time (min) | | | | | | |
| Start | 642 | 582 | 644 | 674 | 608 | 637 |
| End | 807 | 770 | 808 | 820 | 776 | 773 |
| Duration | 165 | 188 | 164 | 146 | 168 | 136 |
| Brookfield Viscosity (Pa s) | | | | | | |
| Immediate | 570 | 598 | 527 | 598 | 588 | 570 |
| 5 minute | 609 | 579 | 565 | 617 | 610 | 590 |
| Density (g/ml) | | | | | | |
| Immediate | 1.356 | 1.359 | 1.436 | 1.372 | 1.368 | 1.406 |
| 5 minute | 1.381 | 1.355 | 1.451 | 1.371 | 1.381 | 1.400 |
| Tensile adhesive strength acc. EN 1348 | (N/mm$^2$) | | | (N/mm$^2$) | | |
| Normal storage (7 days) | 0.90 | 0.90 | 0.99 | 0.77 | 0.85 | 1.02 |
| Normal storage (28 days) | 0.76 | 0.79 | 0.91 | 0.68 | 0.76 | 0.94 |
| Water storage | 0.77 | 0.84 | 0.95 | 0.72 | 0.77 | 0.91 |
| Heat storage | 0.76 | 0.84 | 0.97 | 0.78 | 0.84 | 0.97 |
| Freeze-thaw storage | 0.91 | 0.92 | 1.00 | 0.90 | 0.86 | 0.94 |

TABLE 3-continued

| Example | 3.1 (Comp.) | 3.2 (Comp.) | 3.3 | 3.4 (Comp.) | 3.5 (Comp.) | 3.6 |
|---|---|---|---|---|---|---|
| Open time acc. EN 1346 after 7 days | | (N/mm$^2$) | | | (N/mm$^2$) | |
| 10 min | 0.80 | 0.82 | 1.12 | 1.00 | 0.98 | 1.04 |
| 20 min | 0.43 | 0.49 | 0.61 | 0.54 | 0.59 | 0.55 |
| 30 min | 0.22 | 0.19 | 0.38 | 0.24 | 0.22 | 0.24 |

TABLE 4

| Example | 3.7 (Comp.) | 3.8 (Comp) | 3.9 | 3.10 (Comp.) | 3.11 (Comp.) | 3.12 |
|---|---|---|---|---|---|---|
| RDP | Example 1.3 (3%) | Example 1.3 (2.4%) | Example 1.9 (3%) | Example 1.4 (3%) | Example 1.4 (2.4%) | Example 1.10 (3%) |
| Blended Rubber Particles | 0% | 0.6% | 0% | 0% | 0.6% | 0% |
| $\frac{W}{S}$ | 0.21 | 0.21 | 0.20 | 0.20 | 0.20 | 0.21 |
| Setting time (min) | | | | | | |
| Start | 489 | 520 | 550 | 497 | 485 | 547 |
| End | 596 | 679 | 669 | 600 | 598 | 668 |
| Duration | 107 | 159 | 119 | 103 | 113 | 121 |
| Brookfield Viscosity (Pa s) | | | | | | |
| Immediate | 540 | 562 | 551 | 605 | 627 | 506 |
| 5 minute | 543 | 569 | 568 | 590 | 644 | 492 |
| Density (g/ml) | | | | | | |
| Immediate | 1.447 | 1.443 | 1.418 | 1.464 | 1.465 | 1.438 |
| 5 minute | 1.448 | 1.462 | 1.433 | 1.469 | 1.477 | 1.451 |
| Tensile adhesive strength acc. EN 1348 | | (N/mm$^2$) | | | (N/mm$^2$) | |
| Normal storage (7 days) | 1.08 | 1.06 | 1.06 | 1.09 | 1.13 | 1.15 |
| Normal storage (28 days) | 0.99 | 0.87 | 1.12 | 1.37 | 1.25 | 1.14 |
| Water storage | 0.82 | 0.96 | 0.90 | 0.82 | 0.87 | 0.85 |
| Heat storage | 1.06 | 1.12 | 0.99 | 1.16 | 1.12 | 1.08 |
| Freeze-thaw storage | 0.94 | 1.06 | 1.00 | 0.95 | 0.95 | 0.90 |
| Open time acc. EN 1346 after 7 days | | (N/mm$^2$) | | | (N/mm$^2$) | |
| 10 min | 0.96 | 1.01 | 1.04 | 1.22 | 1.05 | 1.19 |
| 20 min | 0.69 | 0.64 | 0.69 | 0.86 | 0.63 | 0.89 |
| 30 min | 0.60 | 0.41 | 0.46 | 0.62 | 0.42 | 0.66 |

It is evident that the water demand of the composition was not significantly increased upon incorporation of either SB or VAE-containing RDPs comprising, as a co-dried additive, rubber particles in comparison with both rubber-free compositions (see Example 3.1 v 3.3; 3.4 v 3.6; 3.7 v 3.9; and 3.10 v 3.12) and compositions comprising a blend of rubber-free RDP and rubber particles (see Example 3.2 v 3.3; 3.5 v 3.6; 3.8 v 3.9; and 3.11 v 3.12). Therefore, as low water demand is believed to provide a clear indication of both good redispersibility and adhesive properties, it may be concluded that the incorporation of rubber as a co-dried additive in VAE- or SB-containing RDPs did not have a significant negative impact upon either redispersibility within or adhesion of the tested CBTA formulations.

Further, although no significant adhesion improvement observed within the VAE-containing RDP Examples of Table 4, the data included in Table 3 clearly indicates that SB-containing RDP examples of the present invention demonstrate an improvement in tensile adhesive strength in comparison with both rubber-free compositions (see Example 3.1 v 3.3; and 3.4 v 3.6) and compositions comprising a blend of rubber-free RDP and rubber particles (see Example 3.2 v 3.3; and 3.5 v 3.6).

Together, the ETICS and CBTA data provided clearly demonstrate that particles of waste rubber, such as cross-linked or vulcanized rubber e.g. ground tire rubber may be incorporated as a co-dried additive RDPs for use in hydraulically binding e.g. cementitious, compositions. Consequently, because fully redispersible powders may be prepared in which a proportion, e.g. as much as 90%, of the base polymer may be replaced with rubber particles, such technology represents an environmentally acceptable use for waste rubber products.

Further, with specific regard to SB-containing RDP technology, it is clear that the incorporation of such rubber products not only provides a use for waste rubber products, but also provides redispersible powders which, when incorporated into hydraulically binding, in particular cementitious compositions such as CBTAs or ETICS reinforcement coats, provides an improvement in the adhesive strength of resultant hydraulically set composition.

The invention claimed is:

1. A water redispersible polymer powder (RDP) comprising a co-dried admixture of a water-insoluble film-forming polymer and a colloidal stabilizer, wherein said co-dried admixture further comprises crosslinked or vulcanised rubber particles of ground tire rubber.

2. The water redispersible polymer powder according to claim 1, wherein said water-insoluble film-forming polymer comprises a styrene-butadiene copolymer or the copolymerization product of styrene, butadiene and one or more other monomer.

3. The water redispersible polymer powder according to claim 1, wherein said water-insoluble film forming polymer has a glass transition temperature, calculated using the Fox equation, of from −60° C. to 80° C.

4. The water redispersible polymer powder according to claim 1, wherein the colloidal stabilizer is a polyvinyl alcohol.

5. The water redispersible polymer powder according to claim 1, wherein said colloidal stabilizer is present in an amount from 1 to 20 weight percent, based on the total dry weight of the RDP.

6. The water redispersible polymer powder according to claim 1, wherein the weight ratio of said water-insoluble film-forming polymer to said rubber particles is from 99:1 to 1:9.

7. The water redispersible polymer powder according to claim 1, wherein said rubber particles have a mesh particle size of 1000μm or less.

8. A method for producing a water redispersible polymer powder, said method comprising:
  a. providing an aqueous dispersion comprising a water-insoluble film-forming polymer and a colloidal stabilizer; and
  b. drying said aqueous dispersion,
  wherein said aqueous dispersion further comprises crosslinked or vulcanised rubber particles of ground tire rubber.

* * * * *